(12) United States Patent
Okuno et al.

(10) Patent No.: US 7,995,159 B2
(45) Date of Patent: Aug. 9, 2011

(54) LIQUID CRYSTAL DISPLAY APPARATUS

(75) Inventors: Harumi Okuno, Kanagawa (JP);
Osamu Ishige, Tokyo (JP); Masumitsu Ino, Kanagawa (JP)

(73) Assignee: Sony Corporation, Tokyo (JP)

( * ) Notice: Subject to any disclaimer, the term of this patent is extended or adjusted under 35 U.S.C. 154(b) by 103 days.

(21) Appl. No.: 12/200,615

(22) Filed: Aug. 28, 2008

(65) Prior Publication Data

US 2009/0086127 A1  Apr. 2, 2009

(30) Foreign Application Priority Data

Sep. 6, 2007  (JP) .................................. 2007-231991

(51) Int. Cl.
G02F 1/1335  (2006.01)
(52) U.S. Cl. ........... 349/64; 349/117; 349/118; 349/119
(58) Field of Classification Search .................... 349/64, 349/117–119
See application file for complete search history.

(56) References Cited

U.S. PATENT DOCUMENTS

2004/0100597 A1* 5/2004 Fukuda et al. ................ 349/112

FOREIGN PATENT DOCUMENTS

| JP | 06-347617 | 12/1994 |
|---|---|---|
| JP | 2000-111913 | 4/2000 |
| JP | 2003-107440 | 4/2003 |
| JP | 2004-354645 | 12/2004 |
| JP | 2006-003838 | 1/2006 |

OTHER PUBLICATIONS

Japanese Foreign Office Action (JP 2007-231991) dated Jun. 30, 2009.

* cited by examiner

*Primary Examiner* — David Nelms
*Assistant Examiner* — Phu Vu
(74) *Attorney, Agent, or Firm* — K&L Gates LLP

(57) ABSTRACT

A liquid crystal display apparatus, includes a liquid crystal panel including a first substrate, a second substrate disposed in an opposing relationship to the first substrate with a space left, and a liquid crystal layer provided in the space between the first and second substrates, the liquid crystal panel including a pixel region in which a plurality of pixels are provided on the faces of the first and second substrates which oppose to each other such that illuminating light irradiated from the first substrate side upon the second substrate side is transmitted through the pixel region to display an image, and the liquid crystal panel further including a light scattering layer provided on the face of the first substrate on which the illuminating light is illuminated and configured to scatter and transmit the light.

7 Claims, 15 Drawing Sheets

FIG.3
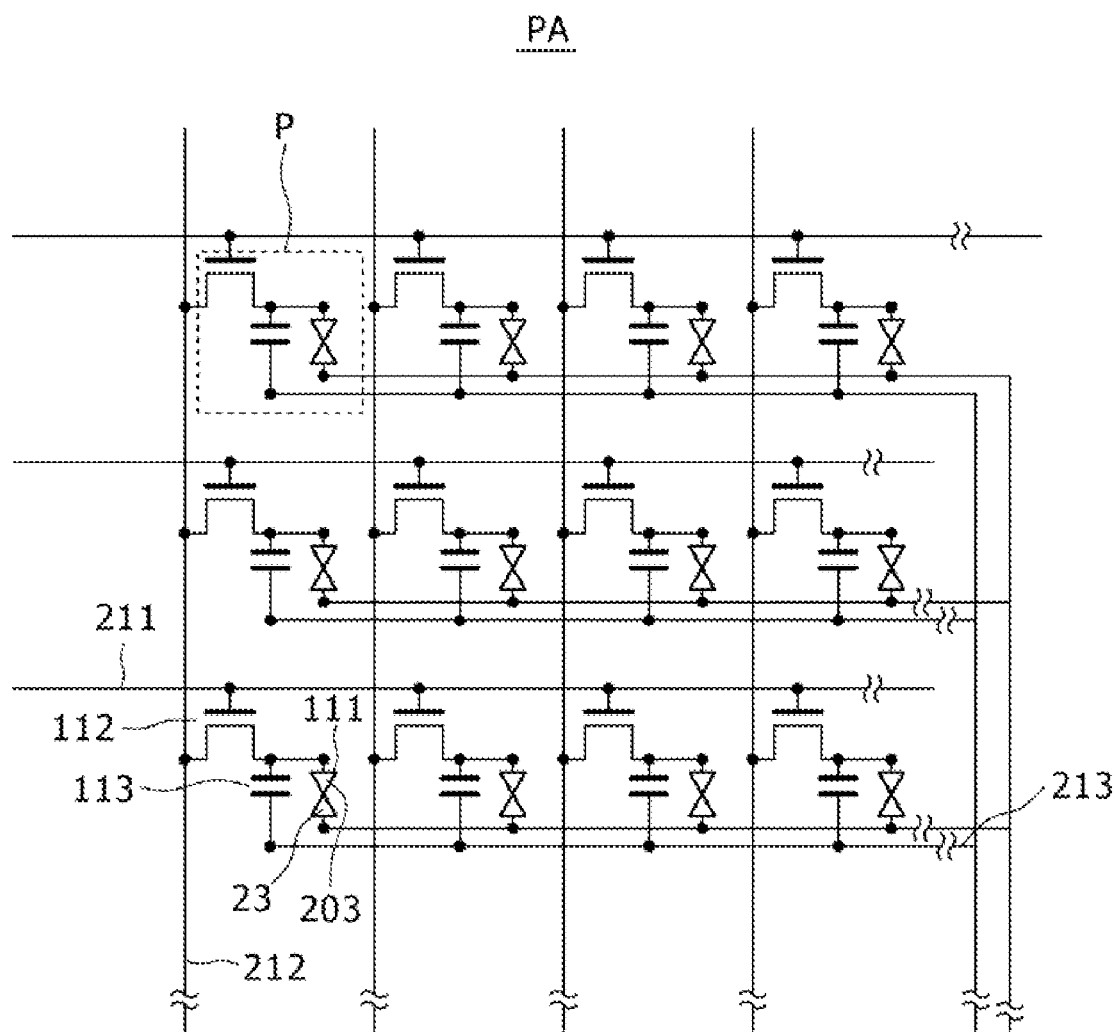
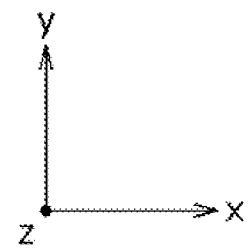

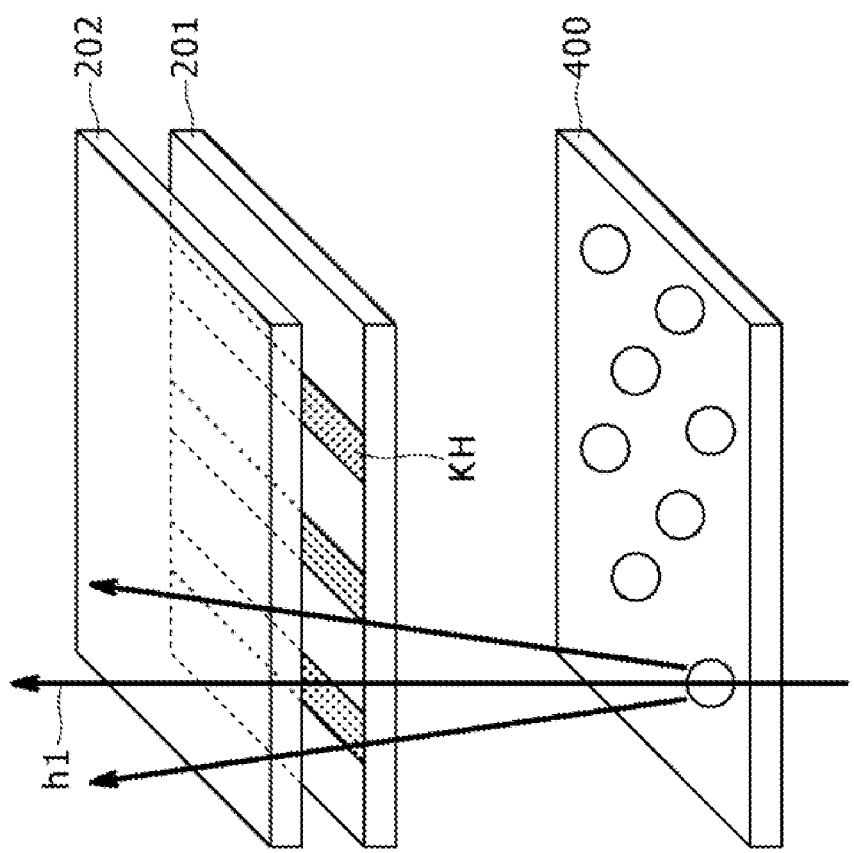
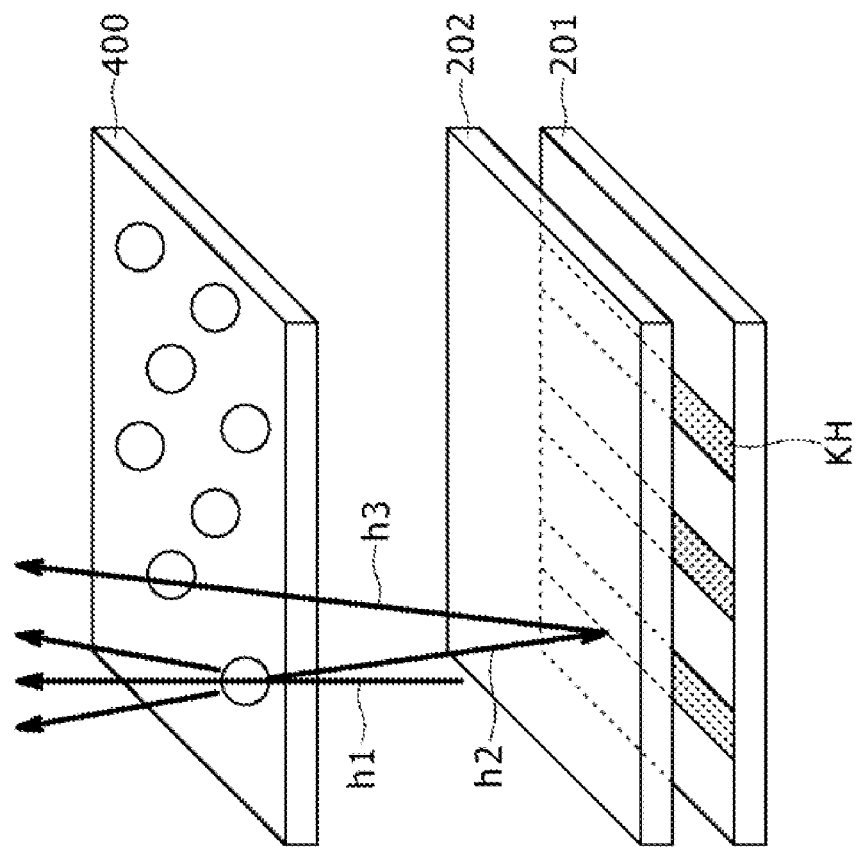

F I G . 5
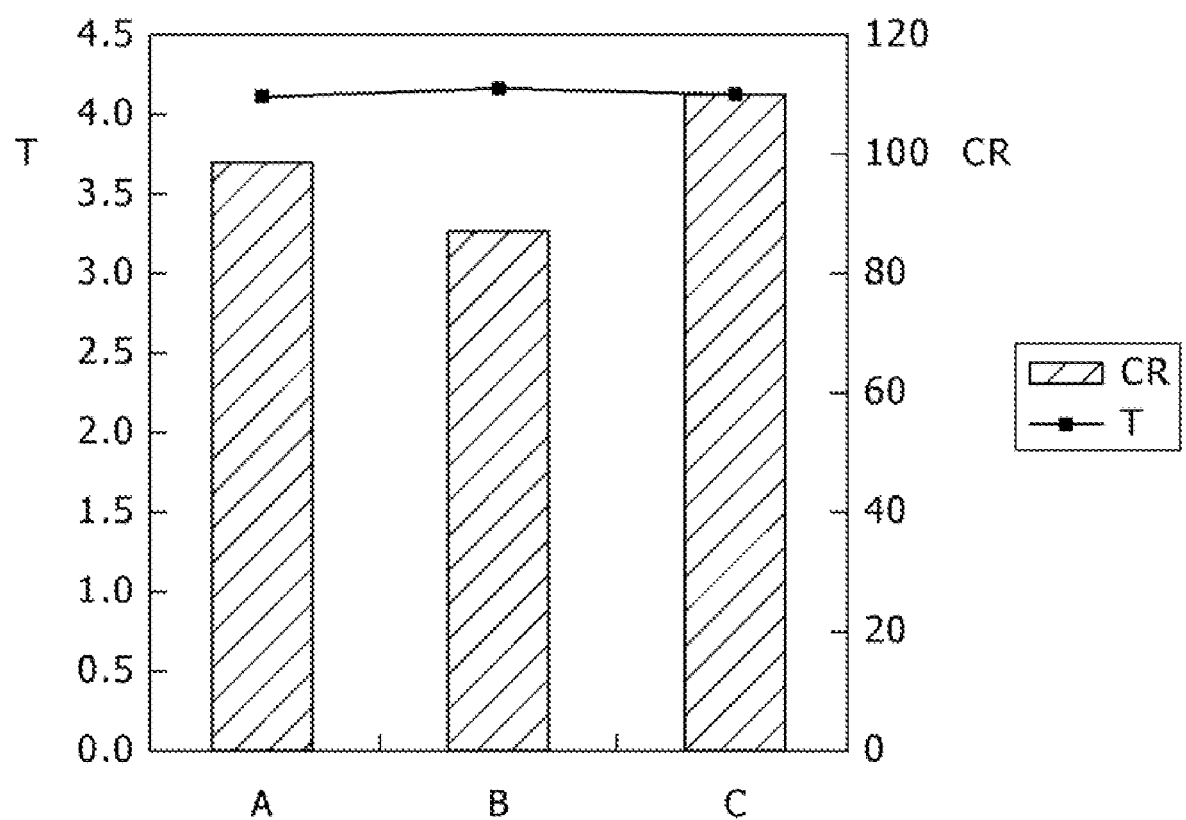

DIRECTION OF MOVEMENT OF LINE OF SIGHT

DIRECTION OF MOVEMENT OF LINE OF SIGHT

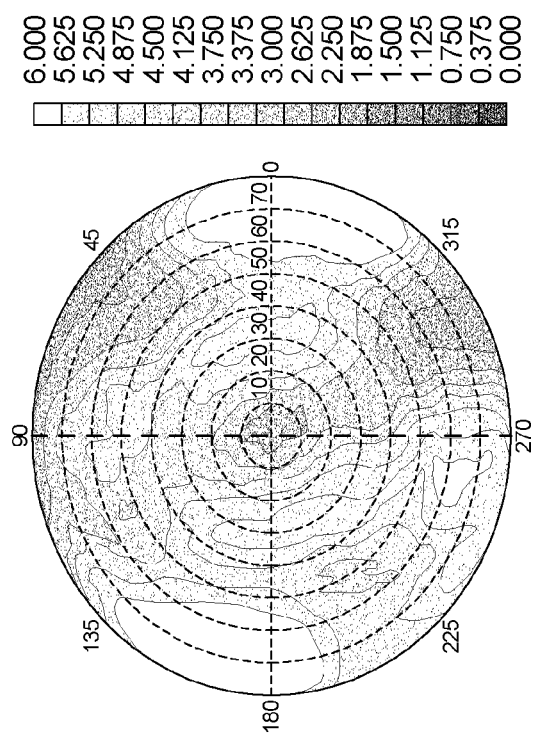
FIG. 10A
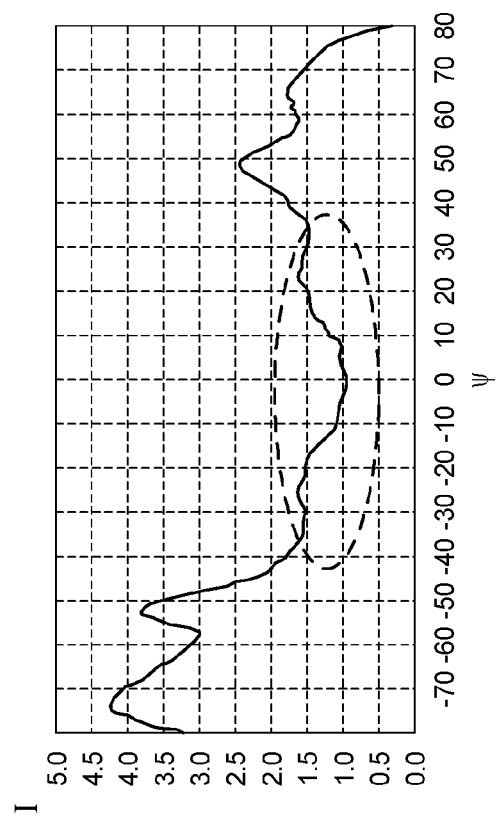
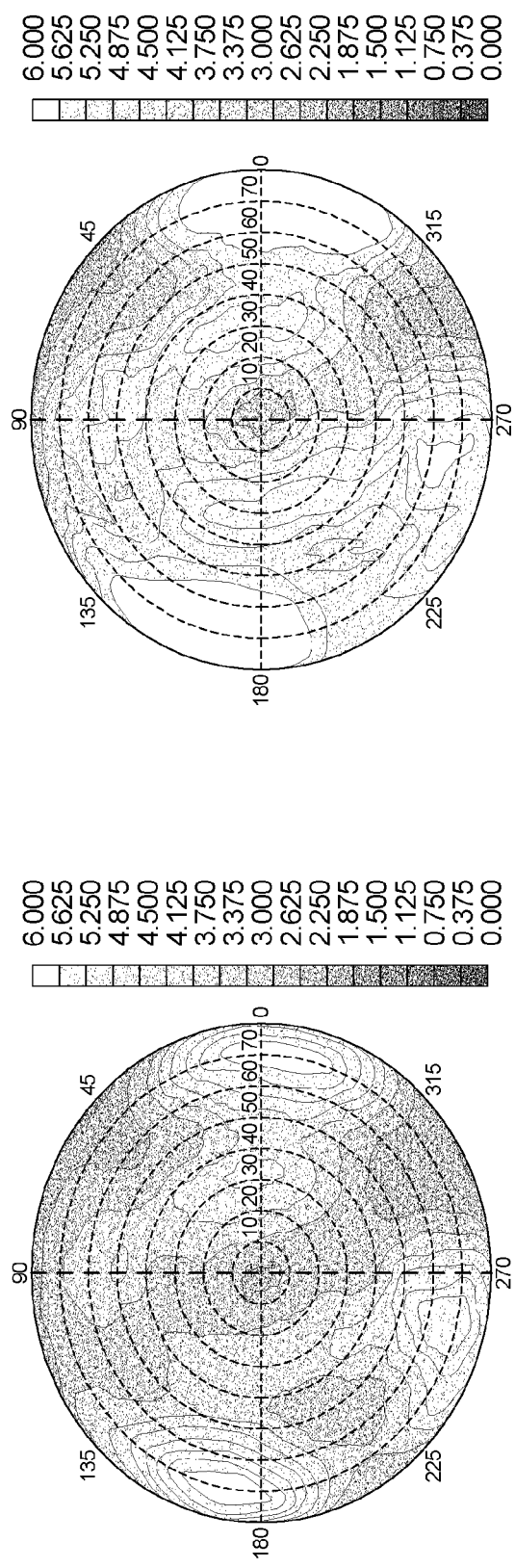
FIG. 10B
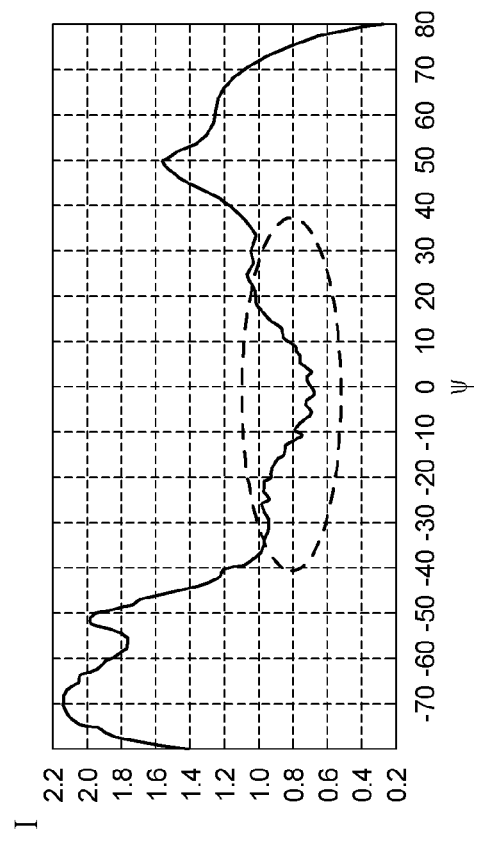

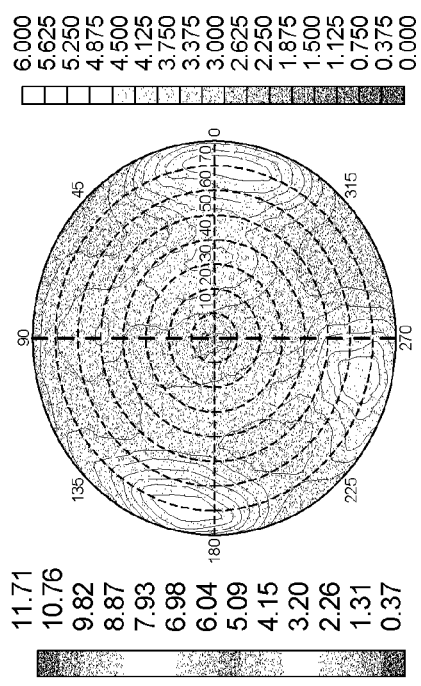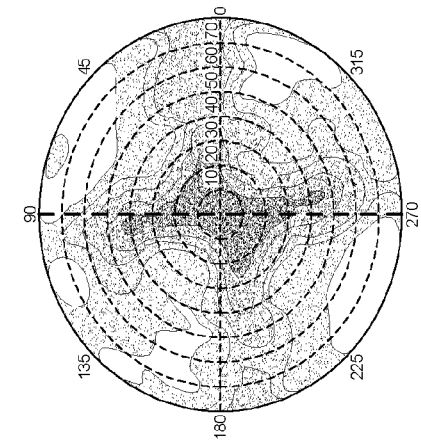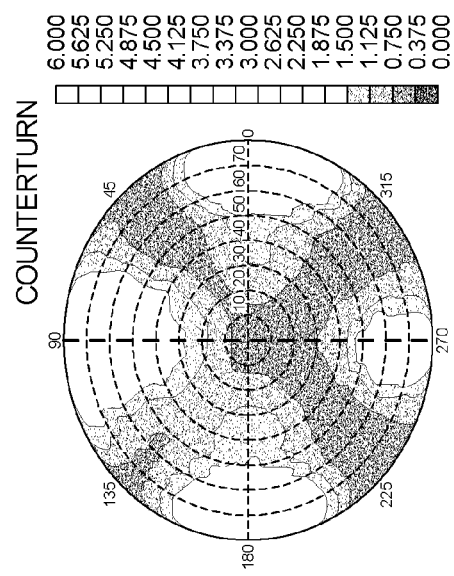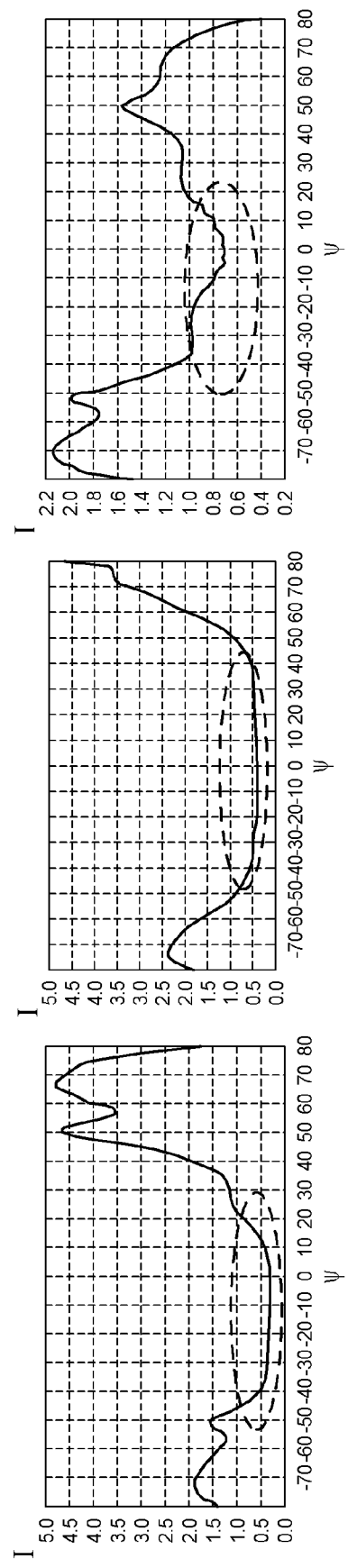
FIG. 11A COUNTERTURN
FIG. 11B
FIG. 11C

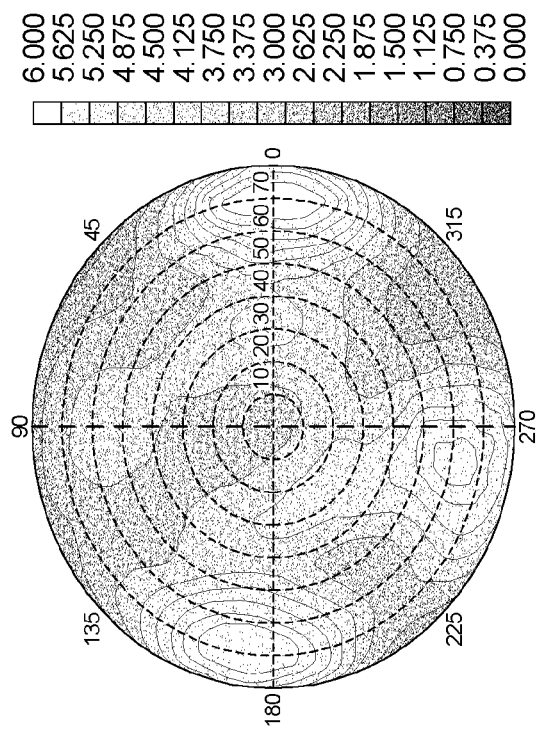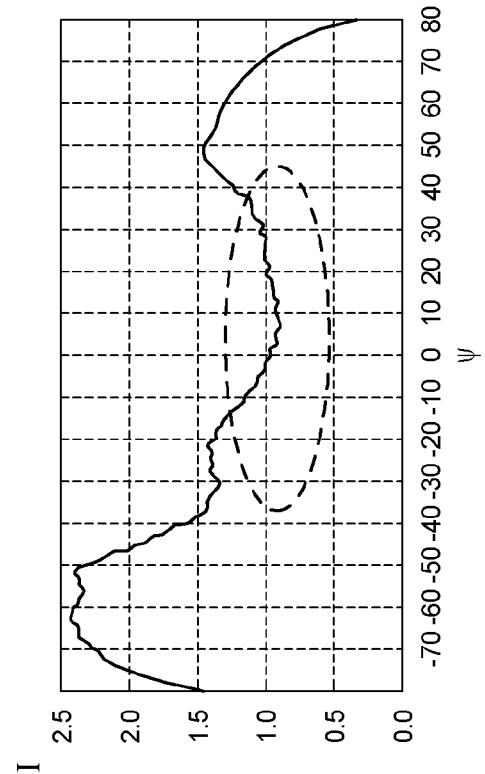
FIG. 14B
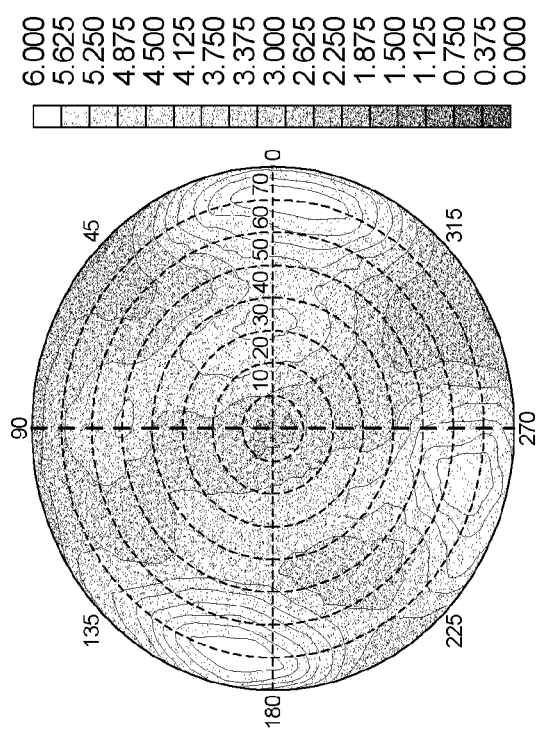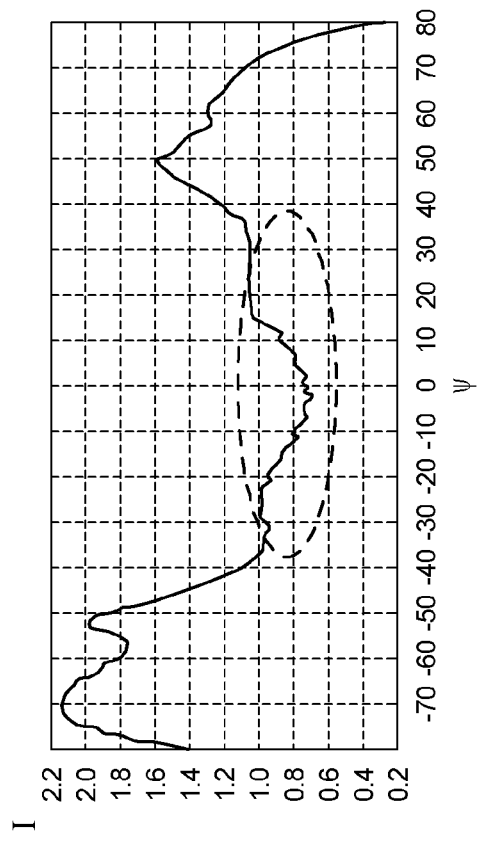
FIG. 14A

LIQUID CRYSTAL DISPLAY APPARATUS

CROSS REFERENCES TO RELATED APPLICATION

The present application claims priority to Japanese Patent Application JP 2007-231991 filed with the Japan Patent Office on Sep. 6, 2007 the entire contents of which being incorporated herein by reference.

BACKGROUND

The present application relates to a liquid crystal display apparatus, and more particularly to a liquid crystal display apparatus wherein illuminating light illuminated from one of a pair of substrates of a liquid crystal panel to the other one of the substrates is transmitted through a pixel region in which a plurality of pixels are provided on faces of the substrates which oppose to each other.

A liquid crystal display apparatus is advantageous in that it is slim, light in weight and low in power consumption. Therefore, the liquid crystal display apparatus is used very much in electronic apparatus for various applications including mobile applications such as a portable telephone set and a digital camera.

A liquid crystal display apparatus includes a liquid crystal panel including a pair of substrates and a liquid crystal layer filled between the substrates. Typically, the liquid crystal display apparatus modulates, in a pixel region thereof, illuminating light illuminated from an illuminating apparatus such as a backlight provided on the rear face side of the liquid crystal panel. An image is displayed on the front face side of the liquid crystal panel with the modulated illuminating light transmitted through the liquid crystal panel.

The liquid crystal panel is, for example, of the active matrix type, in which thin film transistors (TFTs) which function as pixel switching elements and pixel electrodes are arranged in a matrix in a pixel region for displaying an image. When a potential is inputted to a pixel electrode, the corresponding pixel switching element varies a voltage to be applied to the liquid crystal layer to control the transmission factor of light to be transmitted through the pixel, whereby the illuminating light is modulated to carry out display of an image as described above.

A liquid crystal display apparatus which uses such a liquid crystal panel as described above sometimes suffers from a fault that a stripe, a moire or the like sometimes appears on an image displayed on the screen, resulting in deterioration of the image picture quality. Particularly as the refinement of pixels advances, leakage of light becomes likely to occur and such light becomes likely to cause interference. Therefore, such a fault as described above is sometimes actualized.

As a method of correcting for the fault, it has been proposed to provide a light scattering layer which scatters light when the light is transmitted therethrough. For example, a light scattering particle layer containing light scattering particles which scatter light is used as a light scattering layer and is installed on a face of the liquid crystal panel which is observed by an observer. The light scattering layer is interposed between the liquid crystal panel and an optical film such as a polarizing plate. A display apparatus of the type described is disclosed, for example, in Japanese Patent Laid-Open No. 2003-107440 and Japanese Patent Laid-Open No. Hei 06-347617.

SUMMARY

FIGS. 9A to 9C show images displayed when the display screen of a liquid crystal display apparatus displays black over the overall area thereof.

Where an image is raster displayed on the display screen of a liquid crystal display apparatus, a stripe or a moire sometimes appears at a central portion of the screen as seen in FIG. 9A. Then, if the observer moves its line of sight, then the stripe or moiré is observed as if it moved following up the movement of the line of sight as seen in FIG. 9B or 9C. In particular, if the observer moves its line of sight upwardly as seen in FIG. 9B, then the stripe or moire is observed as if it moved upwardly following up the upward movement of the line of sight of the observer. On the other hand, if the observer moves its line of sight downwardly as seen in FIG. 9C, then the stripe or moire is observed as if it moved downwardly following up the downward movement of the line of sight of the observer.

FIGS. 10A and 10B illustrate visual angle characteristics obtained by measurement where liquid crystal panels having different pixel densities or pixel pitches are used. In particular, FIG. 10A illustrates a black luminance visual angle characteristic obtained by measurement where a liquid crystal panel having a pixel density of 229 ppi (1920×4800 pixels) is used. Meanwhile, FIG. 10B illustrates a black luminance visual angle characteristic obtained by measurement where another liquid crystal panel having a pixel density of 114 ppi (960×220 pixels) is used. In each of FIGS. 10A and 10B, a view on the upper side shows a view cone and indicates an omnidirectional visual angle characteristic. Meanwhile, the other view on the lower side indicates a visual angle characteristic in the upward and downward direction from the characteristic of the view on the upper side. In the view on the lower side, the axis of ordinate indicates the luminance I and the axis of abscissa indicates the angular field $\psi$ of view.

As seen from a region surrounded by a dotted line on the graphs on the lower side in FIGS. 10A and 10B, where the liquid crystal panel having the higher pixel density of 229 ppi is used, a greater number of small peaks appear with the visual angle characteristic in the upward and downward direction than where the liquid crystal panel having the lower pixel density of 114 ppi is used. Therefore, particularly where the liquid crystal panel of the higher pixel density is used, it is considered that a stripe or a moire appears with an image in a higher frequency as seen in FIGS. 9A to 9C. In the measurement, where the liquid crystal panel of the higher pixel density of 229 ppi was used, two or three stripes appeared. Meanwhile, where the liquid crystal panel of the lower pixel density of 114 ppi was used, one stripe appeared.

FIGS. 11A to 11C illustrates visual angle characteristics obtained by measurement of liquid crystal display apparatus having different liquid crystal modes. In particular, FIG. 11A illustrates a visual angle characteristic obtained by measurement of a liquid crystal display apparatus whose liquid crystal mode is the TN (twisted nematic) mode. FIG. 11B illustrates a visual angle characteristic obtained by measurement of another liquid crystal display apparatus whose liquid crystal mode is the VA (vertical alignment) and ECB (electrically controlled birefringence) (omnidirectional) mode. FIG. 11C illustrates a visual angle characteristic obtained by measurement of a further liquid crystal display apparatus whose liquid crystal mode is the ECB (one-directional) mode. In each of FIGS. 11A to 11C, a view on the upper side indicates an omnidirectional visual angle characteristic. Meanwhile, the other view on the lower side indicates a visual angle characteristic in the upward and downward direction taken from the characteristic of the view on the upper side. In the view on the lower side, the axis of ordinate indicates the luminance I and the axis of abscissa indicates the angular field $\psi$ of view.

As seen from a region surrounded by a dotted line on the graphs on the lower side in FIGS. 11A to 11C, where the liquid crystal mode is the TN mode or the VA mode, the leakage of light in black luminance is small in amount and the interference by the leakage of light occurs less likely. Therefore, the frequency of appearance of small peaks is low. In contrast, where the liquid crystal mode is the ECB mode, the frequency of appearance of small peaks is high. Therefore, it is considered that, particularly in the ECB mode, a stripe or a moire appears in a high frequency because of leakage of light.

In this manner, it is found that, where a liquid crystal panel has a high pixel density and the liquid crystal mode thereof is the ECB mode, such a fault as a stripe or a moire is actualized on a display image.

In order to improve a liquid crystal display apparatus against appearance of a stripe or a moire on an image to be displayed on the screen, it has been proposed to provide a light scattering layer in a liquid crystal panel as described above.

FIG. 12 shows part of a liquid crystal display apparatus wherein a light scattering layer is provided in a liquid crystal panel.

Referring to FIG. 12, the liquid crystal display apparatus 100c includes a liquid crystal panel 200 including a TFT array substrate 201, a color filter substrate 202 and a liquid crystal layer 203, and a light scattering layer 400 provided on the front side of the liquid crystal panel 200 which is the face to be observed by an observer. In particular, the light scattering layer 400 is interposed between an second optical film 320, which includes a phase difference plate 321 and a polarizing plate 322, and the color filter substrate 202. The light scattering layer 400 is provided such that the Haze value may be 60%. Here, the light scattering layer 400 is formed containing an adhesive material such that the color filter substrate 202 and the second optical film 320 are adhered to each other by the adhesive material.

In the liquid crystal panel 200, illuminating light emitted from the backlight 300 is transmitted through a first optical film 310 including a phase difference plate 311 and a polarizing plate 312 and enters the TFT array substrate 201. The illuminating light entering the TFT array substrate 201 from the rear face side is modulated in a pixel region PA by the liquid crystal layer 203. The modulated illuminating light goes out to the front face side of the liquid crystal display apparatus 100c through the light scattering layer 400 and the second optical film 320 and forms a display image in the pixel region PA.

FIG. 13 shows a display image when the liquid crystal display apparatus displays black over the overall area of the screen thereof where a light scattering layer is provided on the liquid crystal panel.

As seen from FIG. 13, where the liquid crystal display apparatus is configured in such a manner as described above, it is improved against appearance of a stripe or a moire on its screen image.

FIGS. 14A and 14B illustrate visual angle characteristics obtained by measurement of liquid crystal display apparatus which are different in regard to use of a light scattering layer from each other. In particular, FIG. 14A illustrates a visual angle characteristic obtained by measurement of a liquid crystal display apparatus which does not use a light scattering layer. Meanwhile, FIG. 14B illustrates a visual angle characteristic obtained by measurement of a liquid crystal display apparatus which uses a light scattering layer. In each of FIGS. 14A and 14B, a view on the upper side indicates an omnidirectional visual angle characteristic. Meanwhile, the other view on the lower side indicates a visual angle characteristic in the upward and downward direction from the characteristic of the view on the upper side. In the view on the lower side, the axis of ordinate indicates the luminance I and the axis of abscissa indicates the angular field ψ of view.

As seen from a region surrounded by a dotted line on the graphs on the lower side in FIGS. 14A and 14B, where a light scattering layer is not used, the frequency of appearance of small peaks is high, but where a light scattering layer is used, the frequency of appearance of small peaks is low. As apparent from this, since light is scattered by the light scattering layer and the amplitude of the black luminance decreases, the liquid crystal display apparatus is improved against appearance of a stripe or a moiré on a display image thereof.

However, where a liquid crystal panel which includes a light scattering layer as described above is used, "glare" or "roughness" sometimes occurs with the display image.

FIGS. 15A and 15B show display images with which "glare" and "roughness" occur where a liquid crystal panel having a light scattering layer provided thereon is used. In particular, FIG. 15A shows a display image with which "glare" occurs, and FIG. 15B shows another display image with which "roughness" occurs.

As seen from FIGS. 15A and 15B, where a liquid crystal panel having a light scattering layer provided therein is used, the luminance becomes ununiform over the overall area of the display image and "glare" or "roughness" is sometimes observed on the display image.

It is considered that this arises from the fact that the number of light scattering particles included in a light scattering particle layer installed as the light scattering layer is not uniform among different pixel units but has some dispersion. It is considered that the phenomenon described above arises also from the fact that light scattered toward the liquid crystal panel by the light scattering particles included in the light scattering particle layer is reflected by metal wiring lines provided on the liquid crystal panel and emerges from the side of the liquid crystal panel which is observed by the observer.

Therefore, since the dispersion of the number of light scattering particles among pixels increases and also the number of metal wiring lines provided on the liquid crystal panel increases as the refinement of pixels advances, occurrence of the fault is actualized.

In this manner, where a light scattering layer is provided on a liquid crystal panel, the fault that the image picture quality is deteriorated is sometimes caused by the light scattering layer.

Therefore, it is desirable to provide a liquid crystal display apparatus by which the image picture quality of a display image thereof can be improved.

According to an embodiment, there is provided a liquid crystal display apparatus including a liquid crystal panel including a first substrate, a second substrate disposed in an opposing relationship to the first substrate with a space left therebetween, and a liquid crystal layer provided in the space between the first and second substrates, the liquid crystal panel having a pixel region in which a plurality of pixels are provided on the faces of the first and second substrates which oppose to each other such that illuminating light irradiated from the first substrate side upon the second substrate side is transmitted through the pixel region to display an image, and the liquid crystal panel further including a light scattering layer provided on the face of the first substrate on which the illuminating light is illuminated and configured to scatter and transmit the light therethrough.

In the liquid crystal display apparatus, the light scattering layer is provided not on the face of the second substrate of the liquid crystal panel on the side on which a display image is observed by an observer but on the face on the side of the second substrate on which illuminating light is irradiated.

Therefore, occurrence of "glare" and "roughness" on the display image can be prevented.

With the liquid crystal display apparatus, a display image can be displayed with improved image picture quality.

Additional features and advantages are described herein, and will be apparent from the following Detailed Description and the figures.

BRIEF DESCRIPTION OF THE FIGURES

FIG. 3 is a circuit diagram showing part of a circuit formed in a pixel region of the liquid crystal panel of FIG. 2;

FIGS. 4A and 4B are perspective views showing part of the liquid crystal display apparatus of FIG. 1 and illustrating a cause by which occurrence of "glare" and "roughness" is suppressed in the liquid crystal display apparatus;

FIG. 5 is a view illustrating a result of measurement of the transmission factor and the contrast of the liquid crystal display apparatus of FIG. 1;

FIGS. 10A and 10B are views illustrating visual angle characteristics obtained by measurement where liquid crystal panels having different pixel densities or pixel pitches are used;

FIGS. 11A to 11C are views illustrating visual angle characteristics obtained by measurement of liquid crystal display apparatus having different liquid crystal modes;

FIGS. 14A and 14B are views illustrating visual angle characteristics obtained by measurement of a liquid crystal display apparatus which uses a light scattering layer and another liquid crystal display apparatus which does not use a light scattering layer.

DETAILED DESCRIPTION

First Embodiment

Figure 1:
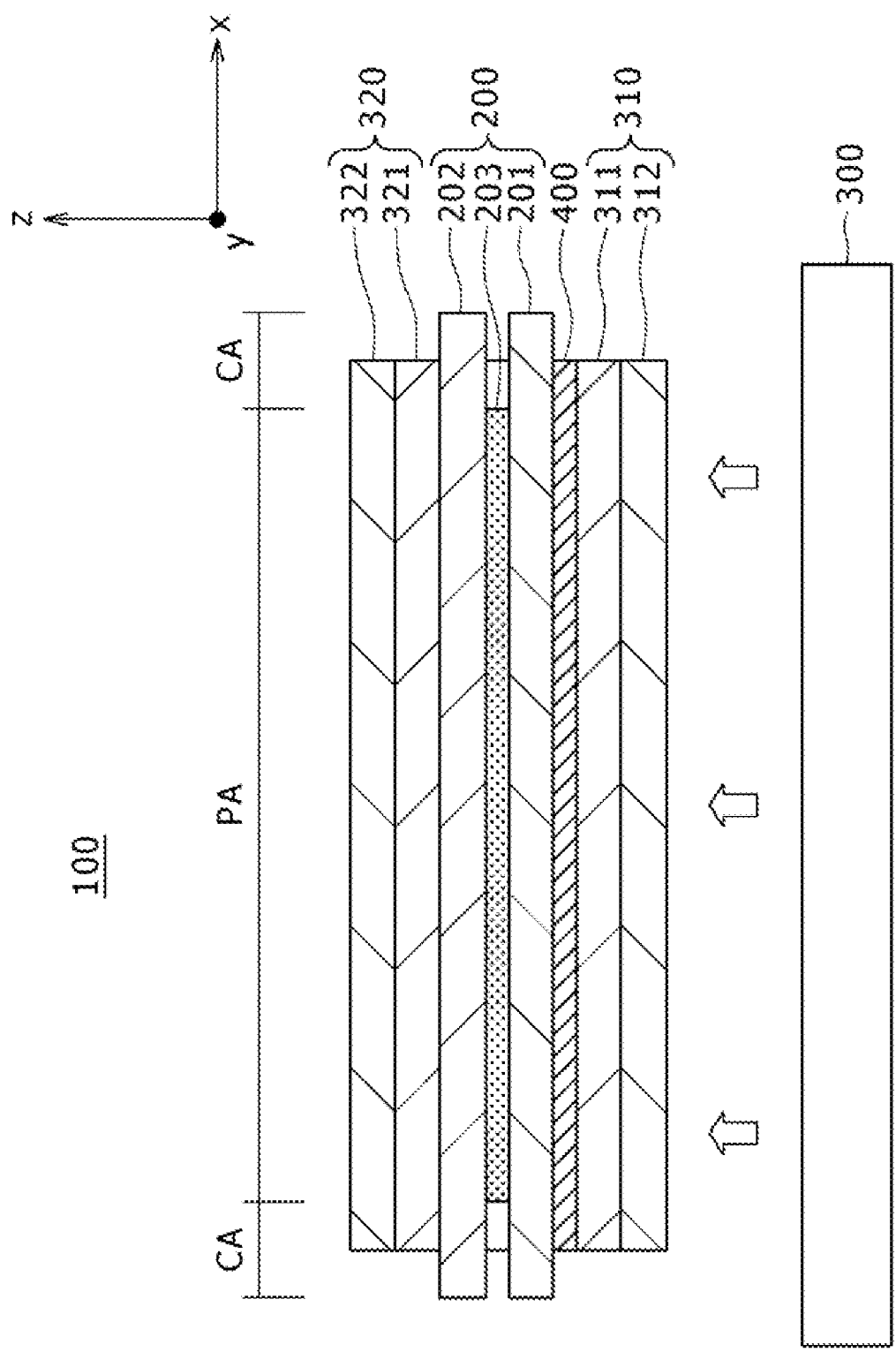
FIG. 1 is a schematic sectional view showing a configuration of a liquid crystal display apparatus according to a first embodiment.

FIG. 1 shows a configuration of a liquid crystal display apparatus 100 according to a first embodiment.

Referring to FIG. 1, the liquid crystal display apparatus 100 includes a liquid crystal panel 200, a backlight 300, a first optical film 310, a second optical film 320, and a light scattering layer 400.

The components of the liquid crystal display apparatus 100 are described successively.

The liquid crystal panel 200 is described first.

In the liquid crystal display apparatus 100, the liquid crystal panel 200 is formed such that, for example, the driving method thereof is the active matrix driving system; the operation mode of liquid crystal is the ECB mode; and the pixel density is 241 ppi. The liquid crystal panel 200 includes a TFT array substrate 201, a color filter substrate 202 and a liquid crystal layer 203 as seen in FIG. 1. In the liquid crystal panel 200, the TFT array substrate 201 and the color filter substrate 202 are adhered in an opposing relationship to each other as seen in FIG. 1. Thus, the liquid crystal layer 203 is provided in a sandwiched relationship between the TFT array substrate 201 and the color filter substrate 202.

Further, in the present embodiment, the liquid crystal panel 200 is of the transmission type and is configured such that illuminating light emitted from the backlight 300 is transmitted therethrough within the pixel region PA in which a plurality of pixels are provided on the opposing faces of the TFT array substrate 201 and the color filter substrate 202 from the TFT array substrate 201 side to the color filter substrate 202 side.

Further, in the liquid crystal panel 200, the first optical film 310 and the second optical film 320 are provided on the opposite face sides of the liquid crystal panel 200 as seen in FIG. 1. In particular, the first optical film 310 and the second optical film 320 are provided in an opposing relationship to each other with the liquid crystal panel 200 interposed therebetween. Here, the first optical film 310 is disposed on the rear face side of the liquid crystal panel 200 adjacent the TFT array substrate 201, and the second optical film 320 is disposed on the front face side of the liquid crystal panel 200 adjacent the color filter substrate 202.

The backlight 300 is disposed so as to be positioned on the rear face side of the liquid crystal panel 200 adjacent the TFT array substrate 201, and illuminating light emitted from the backlight 300 is irradiated upon the rear face of the TFT array substrate 201 which does not oppose to the color filter substrate 202.

Further, the liquid crystal panel 200 includes the pixel region PA for displaying an image and receives, on the rear face thereof, illuminating light emitted from the backlight 300 disposed on the rear face side of the liquid crystal panel 200 through the first optical film 310. In the liquid crystal panel 200 in the present embodiment, illuminating light emitted from the backlight 300 enters not only the first optical film 310 but also the TFT array substrate 201 through the light scattering layer 400. The liquid crystal layer 203 of the liquid crystal panel 200 thus modulates the light received from the rear face side in the pixel region PA. Then, the modulated illuminating light emerges toward the front face side through the second optical film 320 to display an image in the pixel region PA.

Figure 2:
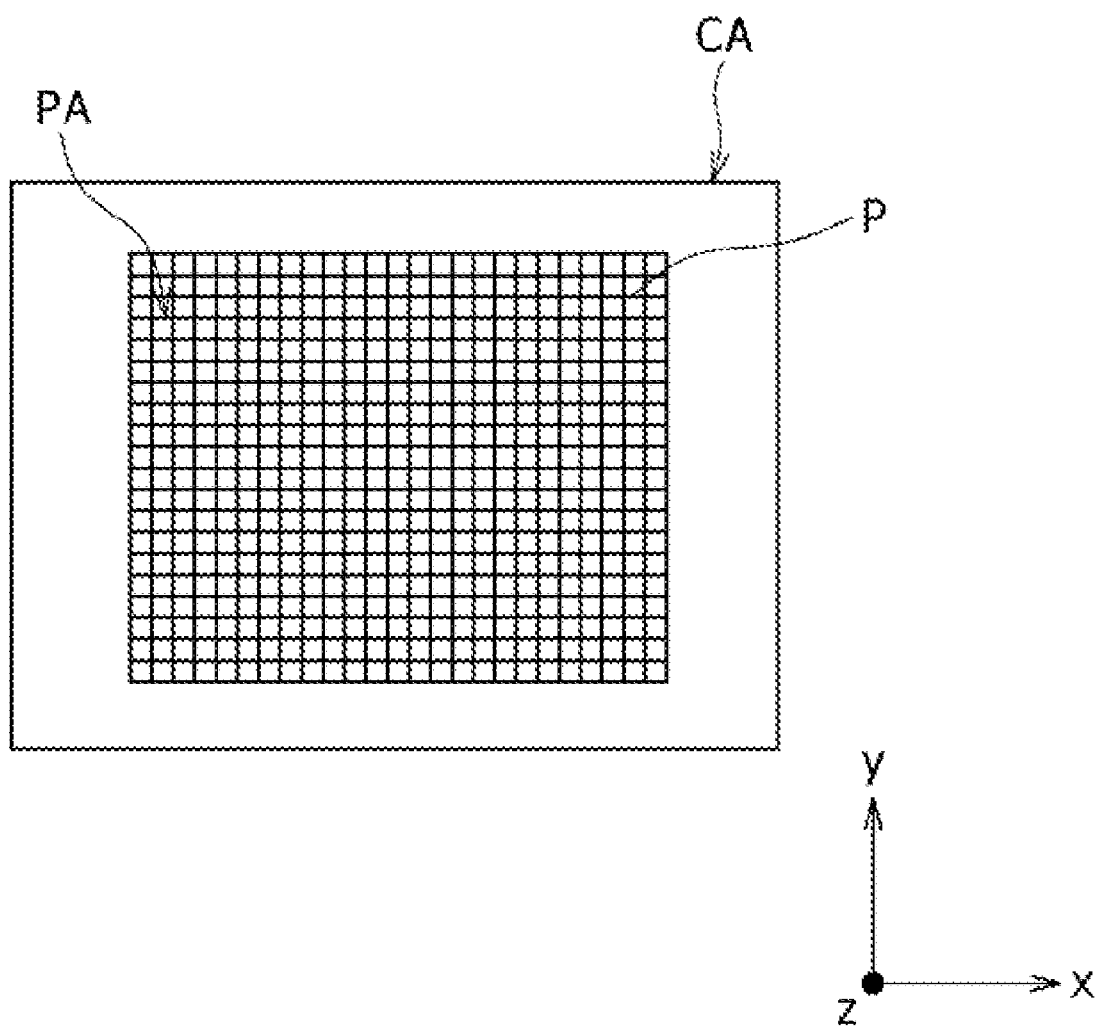
FIG. 2 is a plan view showing a liquid crystal panel of the liquid crystal display apparatus of FIG. 1.

FIG. 2 is a plan view of the liquid crystal panel 200 of the liquid crystal display apparatus 100, and FIG. 3 shows part of a circuit formed in the pixel region PA of the liquid crystal panel 200.

Referring first to FIG. 2, the pixel region PA of the liquid crystal panel 200 has a plurality of pixels P arrayed in a matrix therein. Thus, as seen in FIG. 2, the pixels P are disposed in a juxtaposed relationship in both of an x direction and a y direction.

Referring now to FIG. 3, the pixel region PA has a counter-electrode 23, a pixel electrode 111, a pixel switching element 112 and a storage capacitance element 113 provided in a corresponding relationship to each of the pixels P. Further, scanning wiring lines 211, signal wiring lines 212 and storage capacitance wiring lines 213 are provided in the pixel region PA.

In particular, the counter-electrode 23 and the pixel electrode 111 are provided in an opposing relationship to each other across the liquid crystal layer 203 and are driven such that a potential difference is provided therebetween to apply a voltage to the liquid crystal layer 203 provided in the pixel region PA. Consequently, the ratio at which light is transmitted through the liquid crystal layer 203 in the pixel region PA is controlled to carry out image display.

On the other hand, within a peripheral region CA positioned around the pixel region PA as seen in FIG. 2, a gate driver not shown and a source driver not shown are formed. The gate driver is connected to the scanning wiring lines 211 disposed in a juxtaposed relationship in the vertical direction y as seen in FIG. 3 and successively supplies a scanning signal to the scanning wiring lines 211. Meanwhile, the source driver is connected to the signal wiring lines 212 disposed in a juxtaposed relationship in the horizontal direction x and successively supplies a data signal to the signal wiring lines 212.

Now, the components of the liquid crystal panel 200 are described.

The TFT array substrate 201 of the liquid crystal panel 200 is formed from an insulating material which transmits light therethrough such as, for example, quartz, glass or plastics. The TFT array substrate 201 is opposed in a spaced relationship to the color filter substrate 202 as described hereinabove, and the pixel electrodes 111 from among the components shown in FIG. 3 are formed on a face of the TFT array substrate 201 which opposes to the color filter substrate 202. Further, the pixel switching elements 112, storage capacitance elements 113, scanning wiring lines 211, signal wiring lines 212 and storage capacitance wiring lines 213 are formed in the pixel region PA of the face of the TFT array substrate 201 which opposes to the color filter substrate 202. Meanwhile, in the peripheral region CA, the gate driver not shown and the source driver not shown are formed.

The pixel electrodes 111 of the TFT array substrate 201 are transparent electrodes formed, for example, from ITO (Indium Tin Oxide). The pixel electrodes 111 are formed in a matrix wherein they are juxtaposed in the x direction and the y direction which is substantially perpendicular to the x direction in the pixel region PA as seen in FIG. 3. The pixel switching elements 112 are provided in a corresponding relationship to the pixel electrodes 111, and each of the pixel electrodes 111 is connected to the drain electrode of a corresponding one of the pixel switching elements 112 such that a data signal supplied from the corresponding signal wiring line 212 is applied as a display voltage to the liquid crystal layer 203 through the pixel switching element 112.

The pixel switching elements 112 are provided in a matrix wherein they are juxtaposed in the x direction and the y direction in a corresponding relationship to the pixel electrodes 111 on the TFT array substrate 201 as seen in FIG. 3. Each of the pixel switching elements 112 is, for example, a TFT whose channel region is formed using a thin film of a semiconductor of polycrystalline silicon. The TFT as the pixel switching element 112 is connected at the gate electrode thereof to a scanning wiring line 211 such that a scanning signal is inputted to the gate electrode thereof from the gate driver not shown through the scanning wiring line 211 to control and drive the pixel switching element 112. Further, the TFT is connected at the source electrode thereof to a signal wiring line 212 such that a data signal is supplied to the source electrode thereof from the source driver not shown through the signal wiring line 212. Further, the pixel switching element 112 is connected at the drain electrode thereof to the pixel electrode 111 and the storage capacitance element 113 such that, when it is placed into an on state by a scanning signal applied to the gate electrode thereof, the data signal is applied from the drain electrode thereof to the pixel electrode 111 and the storage capacitance element 113.

The storage capacitance elements 113 are disposed in a matrix wherein they are juxtaposed in the x direction and the y direction in a corresponding relationship to the pixel electrodes 111 on the TFT array substrate 201 as seen in FIG. 3. Each of the storage capacitance elements 113 is formed such that a dielectric film is sandwiched between a pair of electrodes, one of which is connected to the drain electrode of the pixel switching element 112 and the other one of which is connected to a storage capacitance wiring line 213. The storage capacitance wiring line 213 is formed in parallel to an electrostatic capacitor formed by the liquid crystal layer 203 and stores charge originating from a data signal supplied to the liquid crystal layer 203.

The scanning wiring lines 211 are formed such that they extend in the x direction on the TFT array substrate 201 as seen in FIG. 3 and are connected to the pixel switching elements 112 juxtaposed in the x direction. Further, the scanning wiring lines 211 are formed in a juxtaposed relationship and in a spaced relationship from each other in the y direction in a corresponding relationship to the pixel switching elements 112 juxtaposed in the y direction. The scanning wiring lines 211 are formed, for example, using a metal material such as aluminum. The scanning wiring lines 211 are connected to the gate driver not shown such that they supply a scanning signal outputted from the gate driver not shown in such a manner as to successively and time-divisionally select the rows of the pixel electrode 111.

The signal wiring lines 212 on the TFT array substrate 201 are formed in such a manner as to extend in the y direction as seen in FIG. 3 and connected to the pixel switching elements 112 juxtaposed in the y direction. Further, the signal wiring lines 212 are formed in a spaced relationship from each other in the x direction and in a corresponding relationship to the pixel switching elements 112 juxtaposed in the x direction. The signal wiring lines 212 are formed using a metal material such as, for example, aluminum. The signal wiring lines 212 are connected to the source driver not shown such that they supply a data signal outputted from the source driver not shown to the pixel electrodes 111 through the pixel switching elements 112.

The storage capacitance wiring lines 213 are formed on the TFT array substrate 201 in such a manner as to extend in the x direction as seen in FIG. 3 and connected to the storage capacitance elements 113. The storage capacitance wiring lines 213 are formed in a juxtaposed relationship with and in a spaced relationship from each other in the y direction such that they correspond to the storage capacitance elements 113 which are juxtaposed in the y direction. The storage capacitance wiring lines 213 are formed using a metal material such as, for example, aluminum. The storage capacitance wiring lines 213 are connected at one end thereof to the storage capacitance elements 113 and at the other end thereof to the counter-electrode 23.

The color filter substrate 202 of the liquid crystal panel 200 is formed from a substrate of an insulating material which transmits light therethrough such as, for example, quartz, glass or plastic. The color filter substrate 202 is opposed in a spaced relationship to the TFT array substrate 201 as described hereinabove and, though not shown, has the counter-electrode 23 formed on the face thereof opposing to the TFT array substrate 201.

The counter-electrode 23 of the color filter substrate 202 is a transparent electrode formed using, for example, ITO. Here, the counter-electrode 23 is formed solidly over the overall area of the color filter substrate 202 and servers as a common electrode to the pixel electrodes 111.

Though not shown, a black matrix layer and a color filter layer are provided on the color filter substrate 202. The black matrix layer and the color filter layer are formed on the face of the color filter substrate 202 which opposes to the TFT array substrate 201 in such a manner as to be interposed between the counter-electrode 23 and the color filter substrate 202. The color filter layer is formed, for example, from a set of a red filter layer, a green filter layer and a blue filter layer. Each of the red, green and blue filter layers is patterned in regions partitioned so as to individually correspond to the pixels P by the black matrix layer and colors light emitted from the backlight 300.

The liquid crystal layer 203 of the liquid crystal panel 200 is provided in a manner wherein they are sandwiched between the color filter substrate 202 and the TFT array substrate 201 as seen in FIG. 1. Here, liquid crystal molecules of the liquid crystal layer 203 are oriented by orientation films not shown formed on the faces of the TFT array substrate 201 and the color filter substrate 202 which oppose to each other. The liquid crystal layer 203 changes its orientation state in response to a voltage applied between the color filter substrate 202 and the counter-electrode 23 thereby to change an optical characteristic of transmission of light therethrough.

Now, the backlight 300 is described.

The backlight 300 of the liquid crystal display apparatus 100 is disposed in an opposing relationship to the rear face of the liquid crystal panel 200 as seen in FIG. 1 and irradiates illuminating light upon the pixel region PA of the liquid crystal panel 200. The backlight 300 includes a light source not shown including an LED or the like and a light guide plate not shown for converting light emitted from the light source into plane light. The backlight 300 thus irradiates white light as plane light to the overall area of the pixel region PA of the liquid crystal panel 200.

In particular, the backlight 300 is disposed so as to be positioned adjacent the TFT array substrate 201 from between the TFT array substrate 201 and the color filter substrate 202 which compose the liquid crystal panel 200. The backlight 300 thus irradiates the plane light thereof upon the rear face of the TFT array substrate 201 which does not oppose to the color filter substrate 202. In short, the backlight 300 emits illuminating light so as to advance from the TFT array substrate 201 side to the color filter substrate 202 side.

The first optical film 310 is described below.

The first optical film 310 in the liquid crystal display apparatus 100 includes a phase difference plate 311 and a polarizing plate 312 as seen in FIG. 1 and is provided on the rear face of the TFT array substrate 201 upon which illuminating light emitted from the backlight 300 is irradiated. In particular, the first optical film 310 is disposed so as to oppose to the rear face of the liquid crystal panel 200 with the light scattering layer 400 interposed therebetween. In the present embodiment, the first optical film 310 is a lamination film wherein the phase difference plate 311 and the polarizing plate 312 are laminated and is installed such that the phase difference plate 311 and the polarizing plate 312 are juxtaposed in order from the TFT array substrate 201 side.

Now, the second optical film 320 is described.

The second optical film 320 in the liquid crystal display apparatus 100 includes a phase difference plate 321 and a polarizing plate 322 as seen in FIG. 1 and is provided on the front face of the color filter substrate 202 of the liquid crystal panel 200 from which illuminating light emitted from the backlight 300 emerges in such a manner as to oppose to the front face of the liquid crystal panel 200. In the present embodiment, the second optical film 320 is a lamination film wherein the phase difference plate 321 and the polarizing plate 322 are laminated and is installed such that the phase difference plate 321 and the polarizing plate 322 are juxtaposed in order from the color filter substrate 202 side.

Now, the light scattering layer 400 is described.

The light scattering layer 400 in the liquid crystal display apparatus 100 is formed such that it transmits and scatters light in the pixel region PA of the liquid crystal panel 200, and is provided on the rear face side of the TFT array substrate 201 upon which illuminating light emitted from the backlight 300 is irradiated as seen in FIG. 1. The light scattering layer 400 is formed such that the Hayes value thereof is, for example, approximately 45%.

In the present embodiment, the light scattering layer 400 is formed as a light scattering particle layer containing light scattering particles which scatter light. For example, such a material as acrylic particles is used as the light scattering particles to form the light scattering layer 400.

Further, the light scattering layer 400 contains an adhesive material and adheres the TFT array substrate 201 and the first optical film 310 between the TFT array substrate 201 and first optical film 310. For example, such a material as acrylic polymer is used as the adhesive material to form the light scattering layer 400. In short, Hayes adhesive is used to form the light scattering layer 400.

The liquid crystal display apparatus 100 wherein the light scattering layer 400 is disposed on the rear face side of the liquid crystal panel 200 as described above was actually produced and used to display an image. The image display proved that occurrence of "glare" and "roughness" was suppressed.

FIGS. 4A and 4B show part of the liquid crystal display apparatus 100 and illustrate a cause by which occurrence of "glare" and "roughness" is suppressed in the liquid crystal display apparatus 100 of the first embodiment. In particular, FIG. 4A shows an alternative arrangement wherein the light scattering layer 400 is disposed on the front face side of the liquid crystal panel 200, different from that in the embodiment. Meanwhile, FIG. 4B shows the liquid crystal display apparatus 100 wherein the light scattering layer 400 is disposed on the rear face side of the liquid crystal panel 200.

Where the light scattering layer 400 is disposed on the front face side of the light scattering layer 400 as seen in FIG. 4A different from the arrangement of the present embodiment, light h1 transmitted through the liquid crystal panel 200 is sometimes scattered toward the liquid crystal panel 200 side by a light scattering particle contained in the light scattering layer 400. Therefore, the light h2 scattered toward the liquid crystal panel 200 by the light scattering layer 400 may be reflected by a metal wiring line KH provided as a scanning wiring line 211, a signal wiring line 212 or a storage capacitance wiring line 213 on the TFT array substrate 201 and emerge from the front face side of the liquid crystal panel 200 observed by the observer. Therefore, since the light h3 reflected by the metal wiring line KH provided on the TFT array substrate 201 mixes into light which emerges from the front face side of the liquid crystal panel 200 observed by the operator, it is considered that the luminance is rendered ununiform over the overall area of the display image, resulting in occurrence of "glare" and "roughness" on the display image.

On the other hand, where the light scattering layer 400 is disposed on the rear face side of the liquid crystal panel 200 as seen in FIG. 4B similarly as in the present embodiment, light transmitted through the backlight 300 is scattered toward the liquid crystal panel 200 side again and therefore is not reflected by the metal wiring line KH. Therefore, it is considered that, in the present embodiment, the luminance is uniform over the overall area of the display image and occurrence of "glare" and "roughness" on the display image is suppressed.

FIG. 5 illustrates results of measurement of the transmission factor and the contrast of the liquid crystal display apparatus 100 according to the first embodiment. In particular, FIG. 5 illustrates results of measurement of a sample A produced such that the Hayes value of the light scattering layer 400 was 34% and another sample B produced such that the Hayes value of the light scattering layer 400 was 45% where the light scattering layer 400 was disposed on the rear face side of the liquid crystal panel 200 similarly as in the present embodiment. FIG. 5 further illustrates a result of measurement of a sample C produced such that the Hayes value of the light scattering layer 400 was 45% where the light scattering layer 400 was installed on the front face side of the liquid crystal panel 200, different from the present embodiment.

As seen in FIG. 5, with the liquid crystal display apparatus 100 of the present embodiment, a transmission factor T and a contrast CR similar to those where the light scattering layer 400 is installed on the front face side of the liquid crystal panel 200 can be implemented.

Also it was confirmed that appearance of a stripe or a moire on a display image can be suppressed similarly. Particularly where the light scattering layer 400 is disposed between the first optical film 310 and the liquid crystal panel 200 as in the present embodiment, appearance of a stripe or a moire on a display image can be suppressed further effectively when compared with that in the alternative case wherein the light scattering layer 400 is provided between the backlight 300 and the first optical film 310.

As described above, in the present embodiment, the light scattering layer 400 which transmits and scatters light is provided on the face of the TFT array substrate 201 upon which illuminating light is irradiated but is not provided on the face of the TFT array substrate 201 from which the illuminating light emerges. Consequently, in the liquid crystal display apparatus 100 of the present embodiment, appearance of a stripe or a moiré on a display image displayed in the image region by transmission of illuminating light from the TFT array substrate 201 side to the color filter substrate 202 of the liquid crystal panel 200 can be prevented, and also occurrence of "glare" and "roughness" can be prevented.

Accordingly, with the liquid crystal display apparatus 100 of the present embodiment, the picture image quality can be improved.

Second Embodiment

Figure 6:
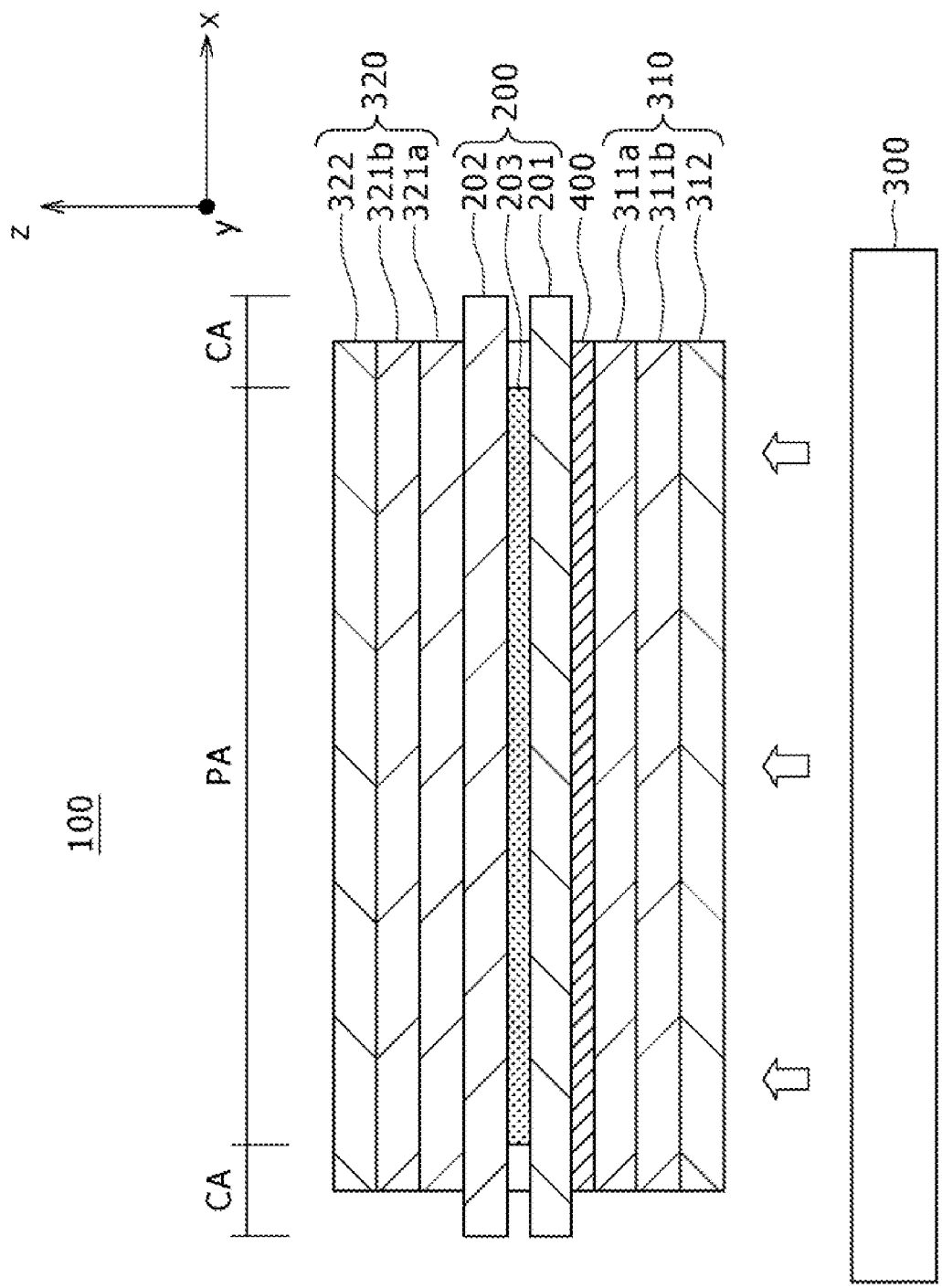
FIGS. 6 and 7 are schematic sectional views showing a configuration of liquid crystal display apparatus according to second and third embodiments, respectively.

FIG. 6 shows a configuration of a liquid crystal display apparatus 100 according to a second embodiment.

Referring to FIG. 6, in the present embodiment, the first optical film 310 and the second optical film 320 are different in configuration from those shown in FIG. 1. Except this, the liquid crystal display apparatus 100 of the present embodiment is similar to that of the first embodiment, and overlapping description of the common configuration is omitted herein to avoid redundancy.

In the present embodiment, the first optical film 310 includes a plurality of phase difference plates 311a and 311b and is provided on the rear face of the TFT array substrate 201 of the liquid crystal panel 200 upon which illuminating light emitted from the backlight 300 is irradiated. For example, the phase difference plate 311a formed as a λ/4 plate and the phase difference plate 311b formed as a λ/2 plate are laminated successively from the liquid crystal panel 200 side.

Meanwhile, the second optical film 320 includes a plurality of phase difference plates 321a and 321b and is provided on the front face of the color filter substrate 202 of the liquid crystal panel 200 from which illuminating light emitted from the backlight 300 emerges. For example, the phase difference plate 321a formed as a λ/4 plate and the phase difference plate 321b formed as a λ/2 plate are laminated successively from the liquid crystal panel 200 side.

Since, in the present embodiment, the light scattering layer 400 is installed on the rear face side of the liquid crystal panel 200 in this manner similarly as in the first embodiment described hereinabove, occurrence of "glare" and "roughness" on the display image can be suppressed.

Accordingly, with the liquid crystal display apparatus 100 of the present embodiment, the image picture quality can be improved.

Third Embodiment

Figure 7:
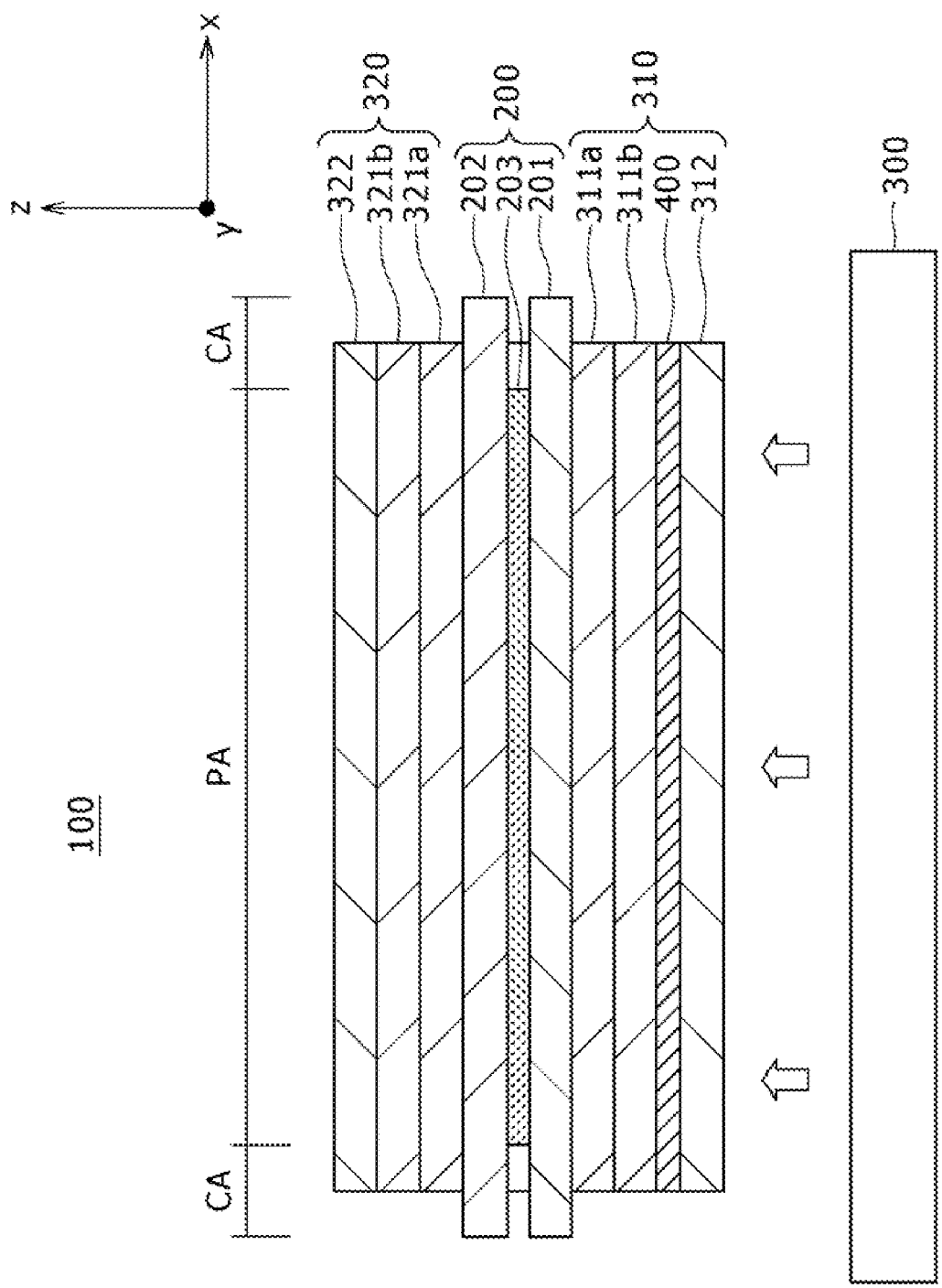

FIG. 7 shows a configuration of a liquid crystal display apparatus 100 according to a third embodiment.

Referring to FIG. 7, in the present embodiment, the position at which the light scattering layer 400 is provided is different from that shown in FIG. 6. Except this, the liquid crystal display apparatus 100 of the present embodiment is similar to that of the second embodiment, and overlapping description of the common configuration is omitted herein to avoid redundancy.

In the present embodiment, the light scattering layer 400 is provided in such a manner as to be interposed between the phase difference plates 311a and 311b of the first optical film 310 and the polarizing plate 312 as seen in FIG. 7.

In this manner, in the present embodiment, the light scattering layer 400 is disposed on the rear face side of the liquid crystal panel 200 similarly as in the second embodiment. Therefore, occurrence of "glare" and "roughness" on the display image is suppressed.

Accordingly, with the liquid crystal display apparatus 100 of the present embodiment, the image picture quality can be improved.

It is to be noted that, in the embodiments described above, the liquid crystal display apparatus 100 is an example of the liquid crystal display apparatus of the present embodiments. Further, in the embodiments described above, the TFT array substrate 201 is an example of a first substrate. Further, in the embodiments described above, the color filter substrate 202 is an example of a second substrate. Further, in the embodiments described above, the liquid crystal layer 203 is an example of a liquid crystal layer. Further, in the embodiments described above, the first optical film 310 is an example of an optical film. Further, in the embodiments described above, the phase difference plate 311, 311a or 311b is an example of a phase difference plate. Further, in the embodiments described above, the polarizing plate 312 is an example of a polarizing plate. Further, in the embodiments described above, the light scattering layer 400 is an example of a light scattering layer.

Further, in the embodiments described above, the pixel region PA is an example of a pixel region.

Further, it should be understood that the present application is not limited to the embodiments described above but includes various modifications.

For example, while, in the embodiments described above, a light scattering particle layer containing light scattering particles is provided as the light scattering layer 400, the light scattering layer 400 is not limited to this. Further, while an adhesive material is used to form the light scattering layer 400, the light scattering layer 400 is not limited to this.

Figure 8:
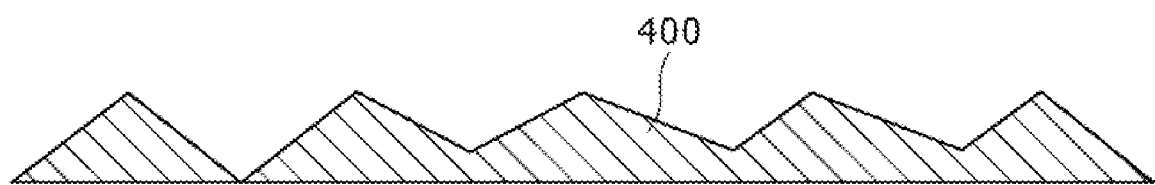
FIG. 8 is a schematic sectional view of a light scattering layer which can be used in the liquid crystal display apparatus of the first to third embodiments.
Figure 9A:
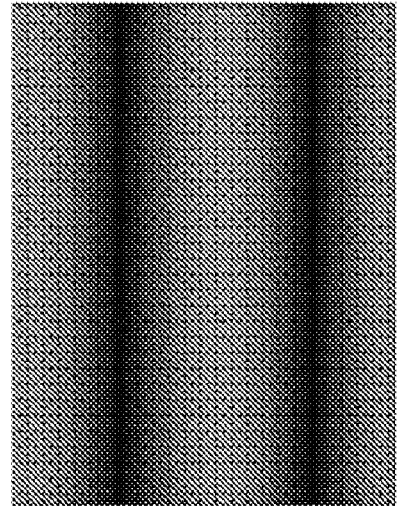
FIGS. 9A to 9C are schematic views showing an image where black is displayed over the overall area of the display screen of a liquid crystal display apparatus.
Figure 9B:
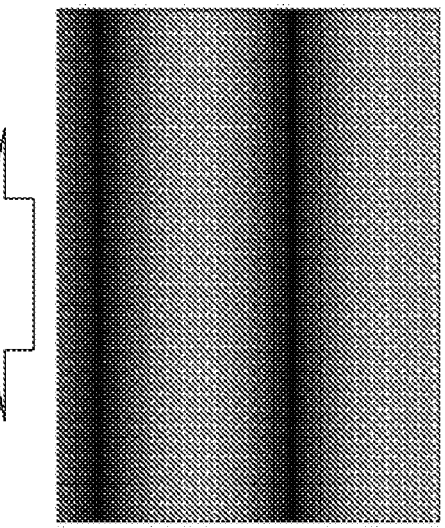
Figure 9C:
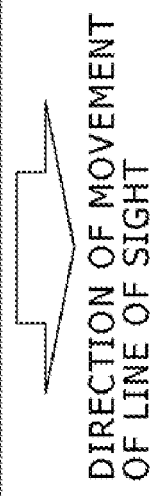
Figure 12:
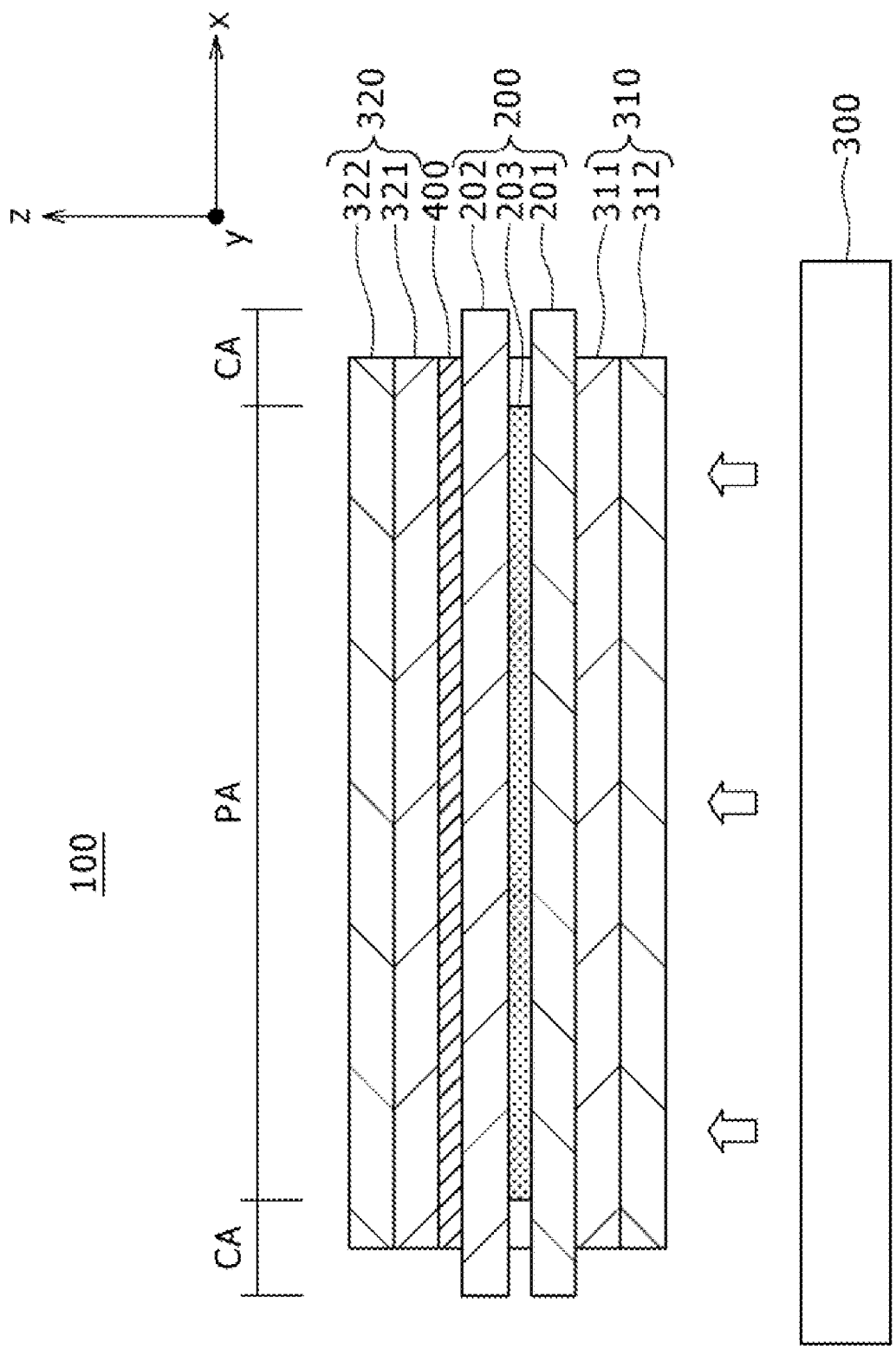
FIG. 12 is a sectional view showing part of a liquid crystal display apparatus wherein a light scattering layer is provided in a liquid crystal panel.
Figure 13:
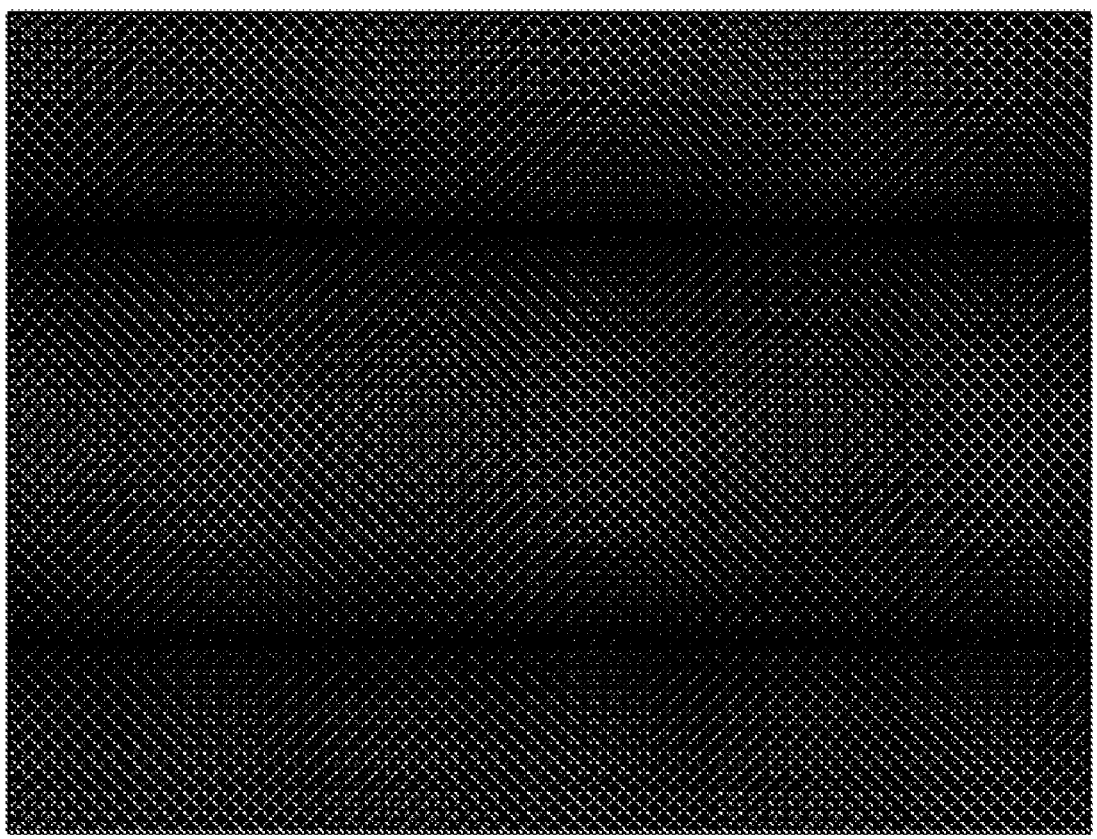
FIG. 13 is a view showing an image where a liquid crystal display apparatus wherein a light scattering layer is provided in a liquid crystal panel displays black over the overall area of the screen.
Figure 15A:
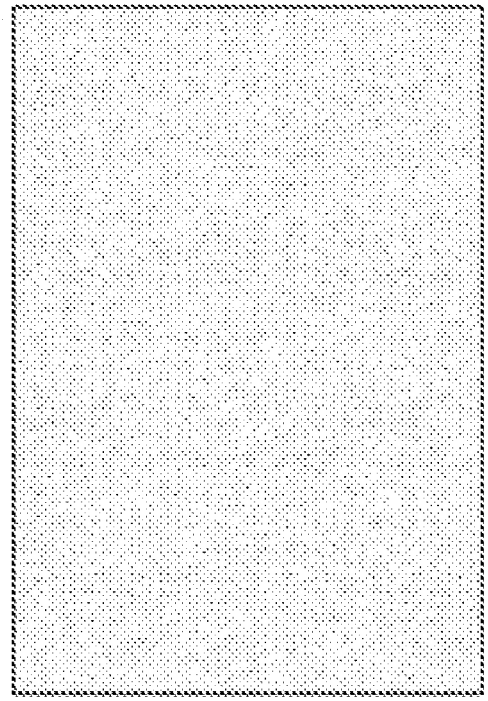
FIGS. 15A and 15B are schematic views showing display images with which "glare" and "roughness" occur where a liquid crystal panel having a light scattering layer provided thereon is used.
Figure 15B:
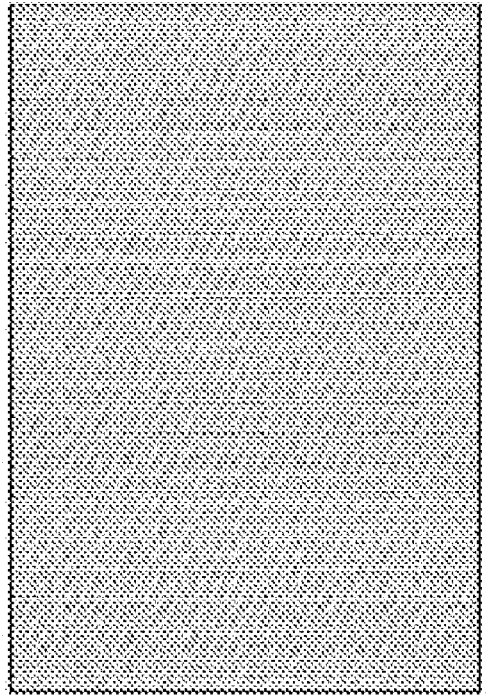

FIG. 8 shows a cross section of the light scattering layer 400 which can be used in the embodiments.

The light scattering layer 400 may be formed such that it has a recessed and projected surface or rough surface as seen in FIG. 8.

Further, while, in the embodiments described above, an optical film including a phase difference plate is used as the optical film, the optical film is not limited to this. For example, the optical film may not include a phase difference plate.

Further, while, in the embodiments described above, the pixel density is set for high definition, the pixel density is not limited to this. The advantage described hereinabove can be achieved irrespective of the pixel density. Further, while, in the embodiments described above, the liquid crystal mode is the ECB mode, the liquid crystal mode is not limited to this. The advantage described above can be achieved also where the liquid crystal mode is a different liquid crystal mode.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display apparatus, comprising:
a liquid crystal panel including a first substrate, a second substrate disposed in an opposing relationship to said first substrate with a space left, and a liquid crystal layer provided in the space between said first and second substrates;
a light source configured to emit light through the liquid crystal panel;
said liquid crystal panel including a pixel region in which a plurality of pixels are provided on the faces of said first and second substrates which oppose to each other such that illuminating light irradiated from the light source from said first substrate side upon said second substrate side is transmitted through said pixel region to display an image; and
said liquid crystal panel further including only one light scattering layer provided on the face of said first substrate on which the illuminating light is illuminated and configured to scatter and transmit the light,
wherein at least one additional optical film is provided between the light scattering layer and the light source,
wherein a plurality of phase difference plates are provided on the rear face of the TFT array substrate, and a first phase difference plate having a different phase difference than a second phase difference plate, and
wherein the light scattering layer is provided between the TFT array substrate and the plurality of phase difference plates.

2. The liquid crystal display apparatus according to claim 1, wherein
said liquid crystal panel further includes a first optical film provided on the face of said first substrate on which the illuminating light is irradiated and said light scattering layer containing an adhesive material such that said first substrate and said first optical film are adhered to each other by said adhesive material between said first, substrate and said first optical film.

3. The liquid crystal display apparatus according to claim 2, wherein
said first optical film includes a first polarizing plate.

4. The liquid crystal display apparatus according to claim 3, wherein
said first optical film is a laminated film wherein a first phase difference plate and the first polarizing plate are successively laminated from said first substrate side.

5. The liquid crystal display apparatus according to claim 1, wherein the first substrate is a TFT array substrate.

6. The liquid crystal display apparatus according to claim 1, wherein the second substrate is a color filter substrate including a black matrix layer and a color filter layer formed thereon.

7. The liquid crystal display apparatus according to claim 4, further comprising a second optical film provided on the face of the second substrate, the second optical film including a second phase difference plate and a second polarizing plate.

* * * * *